April 12, 1949.    C. I. BRADFORD ET AL    2,466,924
OSCILLOGRAPH CONTROL CIRCUIT
Filed May 18, 1945    2 Sheets-Sheet 1

INVENTORS
COLIN IRVING BRADFORD
PAUL F. DARBY
BY
ATTORNEYS

April 12, 1949.                C. I. BRADFORD ET AL                2,466,924
                             OSCILLOGRAPH CONTROL CIRCUIT
Filed May 18, 1945                                               2 Sheets-Sheet 2
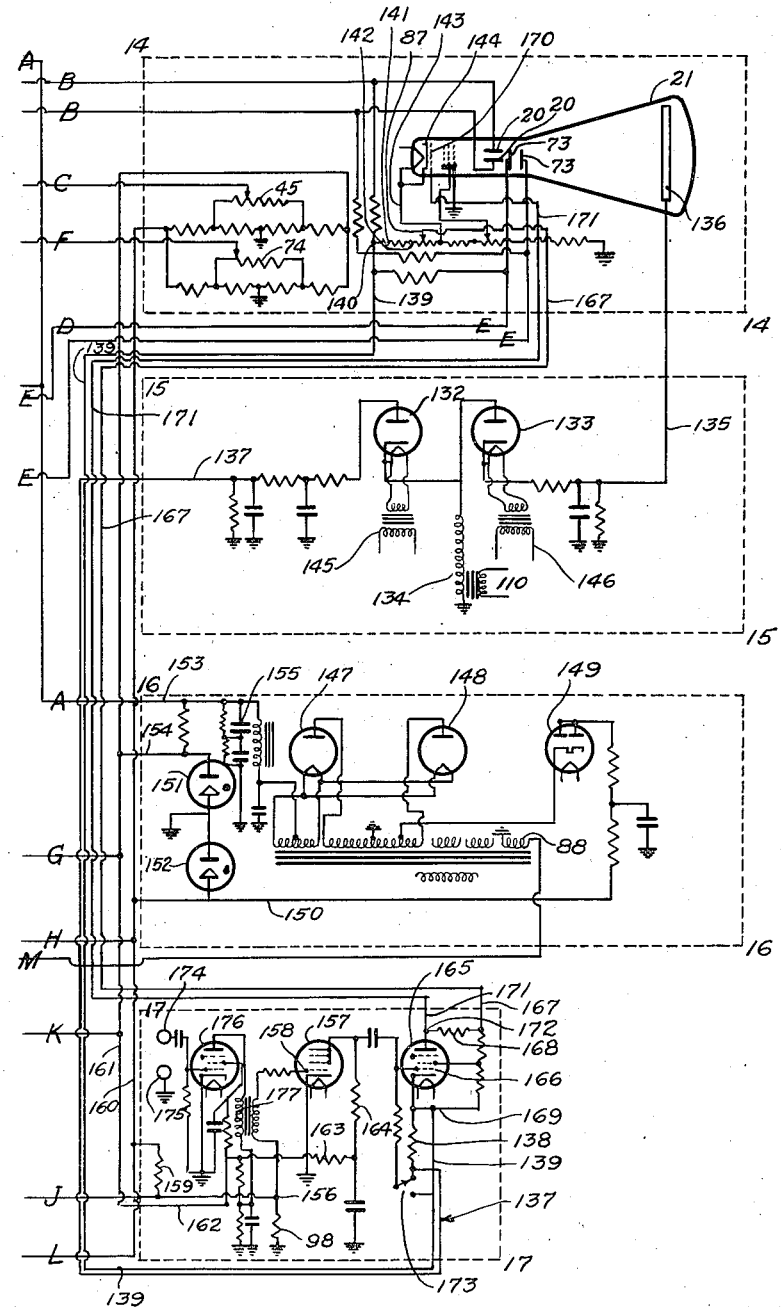
Fig.2
INVENTOR
COLIN IRVING BRADFORD
PAUL F. DARBY
BY
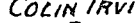
ATTORNEYS Patented Apr. 12, 1949

2,466,924

UNITED STATES PATENT OFFICE 2,466,924

OSCILLOGRAPH CONTROL CIRCUIT

Colin Irving Bradford and Paul F. Darby, Fairfield, Conn., assignors to Remington Arms Company, Inc., Bridgeport, Conn., a corporation of Delaware Application May 18, 1945, Serial No. 594,560

3 Claims. (Cl. 315—22)

This invention relates to cathode ray oscillographs and particularly to an instrument suitable for investigating transient or periodic phenomena such as found in research work in the arms and ammunition field. An example of such investigation is the determination of the shape of the pressure curve as a gun is fired.

The invention has as one of its objects to provide an instrument which will be flexible and suitable for various combinations of use and to contain the desirable features for employment in investigating problems in the arms and ammunition field. One of these requirements is the provision of a means for simultaneously turning on a cathode ray tube spot and initiating the sweep thereof and then extinguishing the spot and stopping the sweep at the end of a predetermined interval. It is also desirable to provide a calibrating circuit particularly adaptable for use in the device. These and other objects will become apparent from the drawings and description which are to be considered merely as exemplary.

In the drawings:

Fig. 2 is an extension to the right of the wiring diagram of Fig. 1 and contains the cathode ray tube circuit, the high voltage supply circuit, the low voltage supply circuit, and the spot control and modulation circuits.

Figure 1:
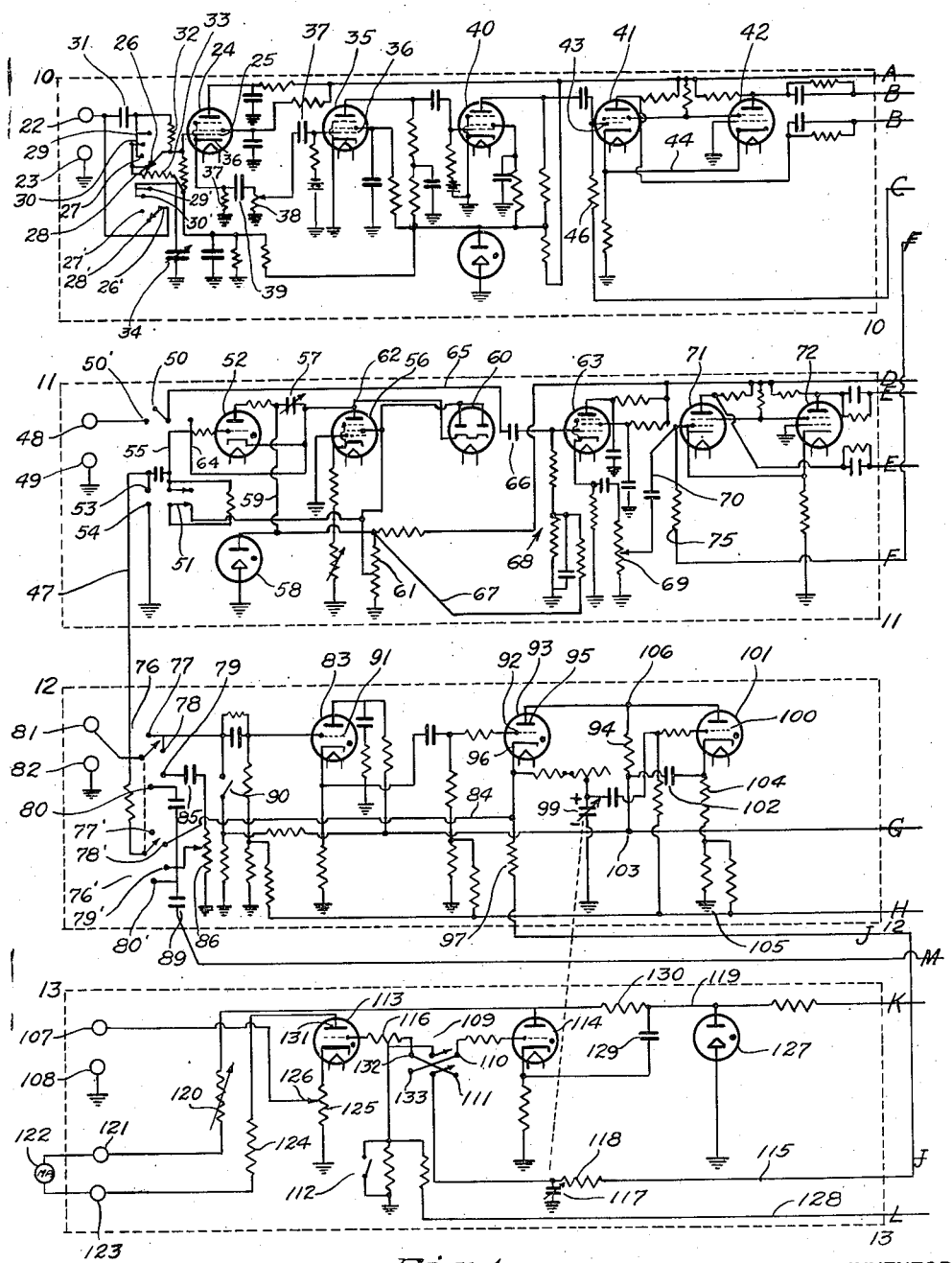
Fig. 1 is a wiring diagram showing the vertical amplifier, sweep generator, horizontal amplifier, spot and sweep exciter, and calibration circuits.

In the investigation of transient phenomena, such as pressure rise as a cartridge is fired, it is necessary to have extreme fidelity in the trace shown on the cathode ray screen because small differences may be quite important in the subject under consideration. For this reason, the various circuits must be arranged carefully so as to obtain the desired results. The attenuator and amplifier stages must be such that the true wave form is transmitted through the circuit to the cathode ray tube. The oscillograph also should be arranged so that it may be used with an external synchronizing voltage on the spot and sweep control circuit or so that internal alternating current may be applied to said circuit. The spot and sweep exciter also is arranged so that the opening or closing of an external circuit, such as the firing of a gun, will initiate the spot and sweep and cause it to persist for a predetermined time interval. The spot and sweep exciter is arranged so that the time interval is adjustable.

In general, the upper block 10—10 enclosed in dotted lines in Fig. 1 is the vertical amplifier circuit for the vertical plates of the cathode ray tube. The circuit enclosed in dotted lines 11—11 comprises the sweep generator and horizontal amplifier. The dotted lines 12—12 enclose the spot and sweep exciter circuit and switching apparatus therefor. The dotted lines 13—13 enclose the calibration circuit.

In Fig. 2, dotted lines 14—14, is seen the cathode ray tube circuit including spot positioning, intensity, and focusing controls. Dotted lines 15—15 include the high voltage supply circuit which is a conventional voltage doubling arrangement. The block 16—16 includes the low voltage supply circuit which is a conventional arrangement having a full wave rectifier circuit, voltage regulator tubes, and a negative supply circuit. The block enclosed by dotted lines 17—17 includes the spot control and modulation circuit. The spot control is excited by the spot and sweep exciter in block 12—12. Provisions are made in block 17—17 for superimposing an alternating current voltage on the control grid of the cathode ray tube so as to give an interrupted trace on the cathode ray tube screen. The circuits of the various blocks now will be described in order.

Vertical amplifier

The vertical amplifier circuit for the vertical plates 20, 20 of cathode ray tube 21 is shown in block 10—10. An arrangement is provided for changing the gain of said amplifier circuit and for also changing the gain and connecting a condenser across the input circuit when it is desired to calibrate or investigate piezo electric crystal gauges such as those used in a pressure indicator as shown in the patent to Bradford, No. 2,350,545. The input for the vertical amplifier is connected across terminals 22 and 23. Tube 24 may be a pentode of the 6J7 type. It is to be understood that equivalent tubes may be used wherever a particular type is mentioned. The control grid 25 of said tube is selectively connected through switch 26' with various control means. Switch 26, 26' is a two-circuit switch having a lower portion 26' connected therewith. When switch 26, 26' is located on the third contact or 27, 27', the control grid 25 is connected to input terminal 22 directly through blocking condenser 31 and in this position the device has maximum gain and can be used when a low voltage input is employed. It is to be noted that the lower contact 27' is blank. When the switch 26, 26' is moved to the lowest set of contacts 28 and 28', the control grid 25 is connected to input terminal 22 through a voltage divider comprising resistances 32 and 33, said control grid being connected at the midpoint between resistances 32 and 33. When in this position, only part of the voltage applied to the amplifier will be used. If it is desired to connect variable condenser 34 across the input terminals for use with a piezo electric pressure gauge or similar device, the upper contacts of switch 26, 26' are used. When the switch is in position 29, 29', the condenser 34 is connected across terminals 22 and 23 and the control grid is connected directly to the input. When it is desired to use less than the full voltage being applied and still have the condenser across the input circuit, switch 26 is moved to the second position or in contact with points 30 and 30'.

Tube 24 has a cathode follower attenuator arrangement with a resistance 37 between the cathode 36 of said tube and ground. Tube 35 has control grid 36 thereof connected through blocking condenser 37 to attenuator 38. Attenuator 38 is in parallel with resistance 37 and connected thereto through condenser 39. In this manner, alternating current only is transmitted to the next tube (35) and direct current is blocked. Attenuator 38 is adjustable, and by this arrangement only the alternating current variation will be transmitted to tube 35 and none of the direct current component. Tube 35 may be a conventional pentode tube of any desired type such as a 6SJ7. Tube 40 may be similar to tube 35, these two tubes acting as conventional amplifiers and being connected to the push-pull amplifier circuit including tubes 41 and 42.

This is a conventional internal signal inverter push-pull amplifier. The signal is transmitted to control grid 43 of tube 41. The cathode circuit of tube 41 contains a connection 44 to the cathode of tube 42. When tube 41 becomes conducting it becomes apparent that the grid potential on tube 42 will become more negative in push-pull arrangement. The output of the push-pull amplifier is connected to the vertical deflection plates 20, 20 of tube 21 through leads B—B. Lead A is the source of low voltage supply for operating the vertical amplifier circuit. The spot positioning means for the vertical amplifier is arranged in a conventional manner from potential divider 45 through lead C—C, resistance 46, to the control grid circuit of tube 41. The other portions of this circuit are conventional and no description is needed thereof.

*Sweep and horizontal amplifier*

The sweep and horizontal amplifier circuit is shown in block 11—11. The sweep generator and horizontal amplifier circuit is started by the spot and sweep exciter which will be described at a later point, the input lead to start the sweep generator being connection 47. When it is desired to apply an externally generated signal to the amplifier switch 50 is close to the left on contact 50'. When switch 51 is at the right (as shown in Fig. 1) the bias on tube 52 is such that the sweep will operate continuously or periodically. In order to stop the sweep, switch 51 must be moved from its right hand position. When switch 51 is in its left hand position or the blades thereof touch contacts 53 and 54, lead 47 from the spot and sweep exciter is connected through 53, the upper switch blade and lead 55 to the grid of gaseous discharge tube 52. The lower contact 54 connects the biasing circuit to ground. Tube 52 may be type 884 or equivalent. When switch 51 is in the right hand position so that the sweep is operating continuously, a synchronizing voltage may be applied through the spot and sweep exciter in a manner which will be described at a later point.

Tube 56 may be a type 6SJ7 constant current tube. Condenser 57 is the sweep generator condenser. This condenser is charged from voltage regulator tube 58, lead 59, condenser 57 through tube 56. In order to limit the voltage applied so as to maintain linearity in the sweep, tube 60 may be connected across voltage divider 61 so that point 62 cannot reach the full voltage applied across voltage regulator 58 and in this manner prevent sweep generator condenser 57 from obtaining full voltage and thus provide for linearity. The voltage divider 61 is connected across the voltage regulator tube 58 so that it becomes evident that tube 60 will be at a lower potential. Condenser 57 is discharged through tube 52 when a signal is placed on the control grid of said tube.

The signal for amplifier tube 63 is taken from condenser 57 through lead 64, switch 50, lead 65, blocking condenser 66. The switch 50 is thrown to the right for this operation. Tube 63 has a cathode follower attenuator arrangement generally similar to tube 24 in block 10—10. The bias for the control grid of tube 63 is taken through lead 67 and resistor network 68. Attenuator 69 is connected by lead 70 to the control grid of the push-pull amplifier tube 71. Push-pull amplifier tube 71 and push-pull amplifier tube 72 are connected in the same manner as tubes 41 and 42 contained in the vertical amplifier. The signal from the horizontal push-pull amplifier is connected by leads E—E to the horizontal deflection plates 73—73 of the cathode ray tube. The horizontal spot positioning is accomplished by potentiometer 74 which is connected through leads F—F and resistance 75 to the control grid of push-pull amplifier tube 71.

*Spot and sweep exciter*

The spot and sweep exciter for the purpose of initiating the spot and sweep or for providing other combinations is shown in the block 12—12. Switches 76 and 76' are an inter-connected two-circuit switch. The operation of this switch will be described for each position in order. When the switch blades are in their upper positions or with the blades on contacts 77 and 77', an impulse placed across input terminals 81 and 82 will cause gaseous discharge tube 83 to trip. The action of this tube will be described at a later point as will the specific arrangement for utilizing the trip impulse. The signal from the spot and sweep exciter is transmitted to the sweep generator through lead 47, which, in turn, is connected to the switch blade of switch 76'. It is seen that 77' is blank so that no signal is applied to the sweep generator in this position. The spot, however, is turned on through lead J—J to the spot control circuit shown within dotted lines 17—17 (Fig. 2). When the switch is placed in the second position or when the blades contact 78 and 78', the impulse placed across input terminals 81 and 82 trips tube 83 and starts the spot, as just described. The signal is also transmitted through lead 84, switch contact 78', lead 47, to the sweep generator to start the same in operation. In other words, in the second position of the switch both the spot and the sweep are initiated simultaneously. When the switch 76, 76' is moved to the third position or where the blades are in contact with 79, 79' a synchronizing voltage may be applied from an external source through input connections 81 and 82, through the switch blade of 76, contact 79, condenser 85, potentiometer 86, contact 79', lead 47, to the sweep generator. This provides continuous operation of the sweep generator. For this operation, the spot is turned on manually by the potentiometer 87 (Fig. 2) in a manner which will be described in conjunction with the description of the spot control and modulation circuit. When the switch 76 and 76' is placed in its fourth or lower position so that the blades are in contact with 80 and 80', internal alternating current of the oscillograph is applied to the sweep generator for synchronization of a continuous sweep. This voltage is applied from a filament transformer winding 88 (Fig. 2) to condenser 89 through contact 80', switch blade of 76', lead 47, to the sweep generator.

The arrangement for utilizing a make or break contact source applied to input connections 81, 82 now will be described. When an external contact is made across the input connections 81 and 82 or an external positive voltage pulse is applied, switch 90 is left in its open position. Then, with switch 76, 76' having been placed in one of its upper two positions, the signal is transmitted through 81, switch blade of 76, contact 77 or 78, to the control grid 91 of the gaseous discharge tube 83, which will trip the tube by raising the grid potential thereof. If it is desired to open a contact in the provision of a signal to the spot and sweep exciter, switch 90 is closed. When switch 90 is closed, a positive source is provided across terminals 81 and 82, which is short-circuited by the external connection. When the external connection or switch is opened, a positive signal is placed on the grid of tube 83 to cause said tube to trip. When gaseous discharge tube 83 is fired, the cathode follower signal circuit applies a signal to the control grid 92 of gaseous discharge tube 93. This serves to cause a flow in the plate circuit of said tube from lead G, resistance 94, plate 95, cathode 96 to ground through signal resistances 97 and 98, (Fig. 2). When tube 93 becomes conducting, variable condenser 99 will start charging in the direction shown. When condenser 99 has a sufficiently positive charge on the upper plate thereof, control grid 100 of gaseous discharge tube 101 will become sufficiently positive to trip tube 101. Condenser 102 has been previously charged from lead G, point 103, the condenser, resistance 104, to ground 105. When tube 101 becomes conducting, condenser 102 discharges through resistance 94 and through the tube 101. The additional flow of current through resistance 94 will depress the potential at point 106 sufficiently to reduce the potential on the anode 95 of tube 93 so that tube 93 will extinguish itself. After condenser 102 has discharged, tube 101 again becomes non-conducting and the control grid regains control, thereby automatically resetting the circuit. The signal, which is of a square wave type, is taken for sweep generator through lead 84, as previously described. The signal for the spot control to turn the spot on automatically is taken by lead J to the spot control apparatus in box 17—17.

*Calibration circuit*

The circuit for calibrating the instrument is contained in box 13—13. Terminals 107, 108 are the output terminals for the calibration circuit and these terminals may be connected, for example, to the input terminals for the vertical amplifier at 22, 23 or for the horizontal amplifier 48, 49. When the latter connection is used, the switch 50 is closed on contact 50' so that the amplifier circuit only is used. The calibrating circuit will first be described as a method of obtaining a positive square wave for calibrating purposes. Switch 109 is thrown to the right so that the switch blades make contact at 110 and 111. Push button switch 112 is open, as shown. In this condition, gaseous discharge tube 113 and gaseous discharge tube 114 are in their non-conducting state. The switch 90 in the spot and sweep exciter is closed so as to place a pulse on the spot and sweep exciter. This causes a pulse to appear on lead J, which starts the spot through the circuit enclosed in box 17—17, which will be described hereafter. The signal is also led through wire 115, contact 111, resistance 116, to the control grid of tube 113. Variable condenser 117 is connected between a point on the other side of resistance 118 and ground. Condenser 117 is also mechanically connected to variable condenser 99 of the spot and sweep exciter. By this means, the capacities of the condensers are varied together. Condenser 117 starts to charge and when the potential on control grid of tube 113 is raised sufficiently high, tube 113 will fire. By this means, condenser 117 supplies a delay before the square wave calibrating circuit becomes operative after the spot and sweep have become energized. The current flow to tube 113 is through positive voltage supply lead K, wire 119, variable resistance 120, terminal 121, external milliammeter 122, terminal 123, resistance 124, through tube 113, and through the cathode resistor 125 to ground. The signal is taken from the cathode resistor by variable contact 126 to terminal 107. The voltage on lead 119 may be regulated by means of the gaseous regulator tube 127. In order to extinguish tube 113, push-button 112 may be operated. Lead 128 supplies negative bias from the voltage supply to the grid of gaseous discharge tube 114. When the push button 112 is operated, the bias on tube 114 is made more positive so that tube 114 fires. Previous to this, condenser 129 has been charged through voltage supply lead 119. Firing of tube 114 will discharge condenser 129 through resistance 130. When this occurs, the additional voltage drop across resistance 130 will be sufficient to depress the potential on anode 131 of tube 113 sufficiently far to extinguish tube 113. Tube 114 extinguishes itself upon the discharge of condenser 129, thus making this circuit automatically resetting.

In order to supply a negative square wave for calibration purposes, switch 109 is thrown to the left so that the switch blades are on contacts 132 and 133. Switch 112 is then closed so as to trip tube 113, the control grid of tube 113 having previously had negative bias placed thereon through lead 128 and resistance 116. Tube 113 then becomes conducting. Then switch 90 may be closed so as to start the spot which will again provide a signal through lead J, lead 115, resistance 118, switch 109, contact 133, to the control grid of gaseous discharge tube 114, condenser 117 again charges and when it has become sufficiently charged, the bias on tube 114 will be such as to cause this tube to trip, condenser 129 having previously become charged. The additional current through resistance 130 then will depress the potential on anode 131 of gaseous discharge tube 113 and cause conduction therethrough to stop. The change in the cathode circuit from conducting to non-conducting will provide a negative square wave between terminals 107 and 108.

Variable resistance 120 can be changed so as to give the desired current flow through tube 113, external meter 122 being available for determination of this current flow. Then, the adjustable tap 126 on cathode resistor 125 may be operated to give the desired voltage across terminals 107 and 108.

High voltage supply

The high voltage supply is shown in box 15—15 including two rectifier tubes, 132 and 133, which may be type 879. The tubes may be supplied from transformer 134 having a secondary to give about 4000 volts. The tubes are connected in voltage doubler arrangement so that lead 135 to the intensifier plate 136 of the cathode ray tube will be approximately plus 2000 volts. Lead 137 (box 15—15, box 17—17) is connected through lead resistance 138, lead 139, up to point 140 (box 14—14). The cathode of tube 21 is supplied from point 140 through resistance 141, 142, lead 143, to cathode 144. The potential at point 140 is substantially minus 2000 volts. In this manner, there is a total potential of 4000 volts supplied across tube 21. Transformers 145 and 146 are filament transformers for tubes 132 and 133 respectively.

Low voltage supply

Low voltage supply circuit is shown in box 16—16 and is a conventional full wave rectifier circuit having rectifier tubes 147 and 148 which may be type 81. Tube 149 is a half wave rectifier to supply a negative bias for the various tubes of the circuit, said bias being supplied through wire 150 connected to lead H—H and L—L. Voltage regulator tubes 151 and 152 may be used for the purpose of regulating the voltage supplied, tube 152 regulating the negative supply and tube 151 regulating the positive supply. The positive leads comprise wires 153 and 154. The voltage supplied by lead 153, for example, can be approximately 600 volts and the voltage by lead 154 approximately 150 volts. There is a condenser filter network 155 of conventional design.

Spot control and modulation

The spot control and modulation device is for the purpose of turning the spot on and off when a signal is supplied by the spot and sweep exciter. There is also provision to superimpose an alternating current on the spot control so as to give an interrupted trace. The positive signal from the spot and sweep exciter is carried by lead J to point 156. Tube 157 is an amplifier tube and may be a pentode type 6SJ7. Normal negative cut-off bias is supplied to tube 157 from tube 149, lead 150, lead 160, resistance 159 to the control grid of tube 157 through the secondary of transformer 177. As tube 157 becomes conducting due to a positive pulse carried by lead J the plate current flows from the voltage supply lead 154 (box 16—16), lead 161, lead 162, resistance 163, resistance 164, through tube 157. The signal from the place circuit of tube 157 is carried to the control grid 166 of amplifier tube 165 which may be a pentode of the 6SK7 type. As tube 157 becomes more conducting, the signal on the control grid 166 of tube 165 will be such as to reduce the conduction of 165. The plate circuit of 165 may be traced from contact 87 on resistance 142, lead 167, signal resistance 168, tube 165, point 169, lead 139, back to point 140 so that a positive potential difference between a point on resistance 87 and point 140 is applied across tube 165. The bias on the control grid 170 of the cathode ray tube is supplied from point 172 through lead 171 to the grid 170. Under normal conditions, the point 172 is more negative than when tube 165 has conduction reduced therethrough. When the conduction through 165 is reduced, point 172 becomes more positive due to less flow of current through resistance 168, thereby causing control grid 170 of the cathode ray tube to become more positive. Switch 173 is in the upper position as shown when it is desired to set the intensity of the cathode ray tube. When the switch is in the upper position, the negative bias on tube 165 is increased sufficiently so as to turn on the spot. When the device is ready for operation, switch 173 is placed in its lower position so that reduced bias is on the tube 165, causing it to be more conducting.

If it is desired to provide an interrupted trace such as, for example, to put a time base directly on the trace, a source of alternating current may be connected to leads 174, 175. This signal is applied to amplifier tube 176. The plate circuit of tube 176 passes through the primary of transformer 177 and the secondary of transformer 177 is located in the grid circuit for tube 157. In this manner, alternating current is superimposed on the grid bias for tube 157 so that during the negative impulses of the modulating current, the trace will be blanked out.

What is claimed is:

1. A pulse generator for producing a square wave output of adjustable time duration comprising a normally non-conducting grid controlled gaseous tube having its cathode at a higher potential when the tube is conducting than when the tube is non-conducting; means to apply an input signal to the grid of said tube to render said tube conducting; a normally discharged condenser connected between said cathode and a point of lower potential to be charged when said tube is conducting; adjustable means to vary the RC time constant of the charging circuit of said condenser; a second normally non-conducting grid controlled gaseous tube having its grid coupled through a coupling condenser to the cathode side of said normally discharged condenser; electrical circuit means connecting the plates of both said gaseous tubes together; a single plate resistor connecting said common plate connection to a source of positive potential; and a normally charged condenser connected between the cathode of said second gaseous tube and said source of positive potential in shunt relation to said second tube whereby a square wave pulse of time duration controlled by said adjustable means may be taken from the plate cathode circuit of said first tube when said first tube is fired by a positive pulse applied to its grid, said second tube firing when said normally discharged condenser has been sufficiently charged to overcome the bias of said second tube, the discharge of said normally charged condenser through said second tube immediately extinguishing said first tube by robbing it of plate voltage as a function of the increased current through said single plate resistor and subsequently extinguishing said second tube when the voltage of said normally charged condenser falls below that required to maintain ionization in said second tube.

2. In combination with a cathode ray oscillograph, the pulse generator described in claim 1, an electronic bias control circuit for said oscillograph constructed and arranged for normally biasing the oscillograph so that no spot appears thereon; electrical circuit means applying the pulse from said generator to said bias control circuit to reverse the condition thereof so that a spot does appear on said oscillograph; a sweep voltage generator constructed and arranged to apply a spot deflecting voltage to said oscillograph; and electrical circuit means to apply the pulse from said generator as a synchronizing signal to initiate the action of said sweep voltage generator simultaneously with the turning on of said spot.

3. In combination with a cathode ray oscillograph the pulse generator described in claim 1, biasing means for the control grid of the cathode ray tube comprising a voltage divider, one portion of which is in parallel with the cathode to plate path through a vacuum tube, the control grid of said cathode ray tube being so connected to said voltage divider as to be biased negatively to cut off when said vacuum tube is non-conducting so that no spot appears on the screen of said cathode ray tube; electrical circuit means applying the pulse from said pulse generator to said vacuum tube to cause same to become conducting and decrease the negative bias on said cathode ray tube permitting a spot to appear thereon; a sweep voltage generator constructed and arranged to apply a spot deflecting voltage to said cathode ray tube; and electrical circuit means to apply the pulse from said pulse generator to said sweep voltage generator as a synchronizing signal to initiate the operation of said sweep generator simultaneously with the appearance of a spot on said cathode ray tube.

COLIN IRVING BRADFORD.
PAUL F. DARBY.

REFERENCES CITED

The following references are of record in the file of this patent:

UNITED STATES PATENTS

| Number | Name | Date |
|---|---|---|
| 2,089,430 | Roys et al. | Aug. 10, 1937 |
| 2,222,943 | George | Nov. 26, 1940 |
| 2,303,924 | Faudell | Dec. 1, 1942 |
| 2,315,848 | Geohegan | Apr. 6, 1943 |
| 2,360,857 | Eldredge | Oct. 24, 1944 |
| 2,363,810 | Schrader et al. | Nov. 28, 1944 |
| 2,406,970 | Smith | Sept. 3, 1946 |
| 2,415,870 | De Ryder | Feb. 18, 1947 |
| 2,431,766 | Miller et al. | Dec. 2, 1947 |